March 16, 1926.                                                 1,576,819
J. B. GALBRAITH
CENTERING AND ALIGNING APPARATUS
Filed April 18, 1925
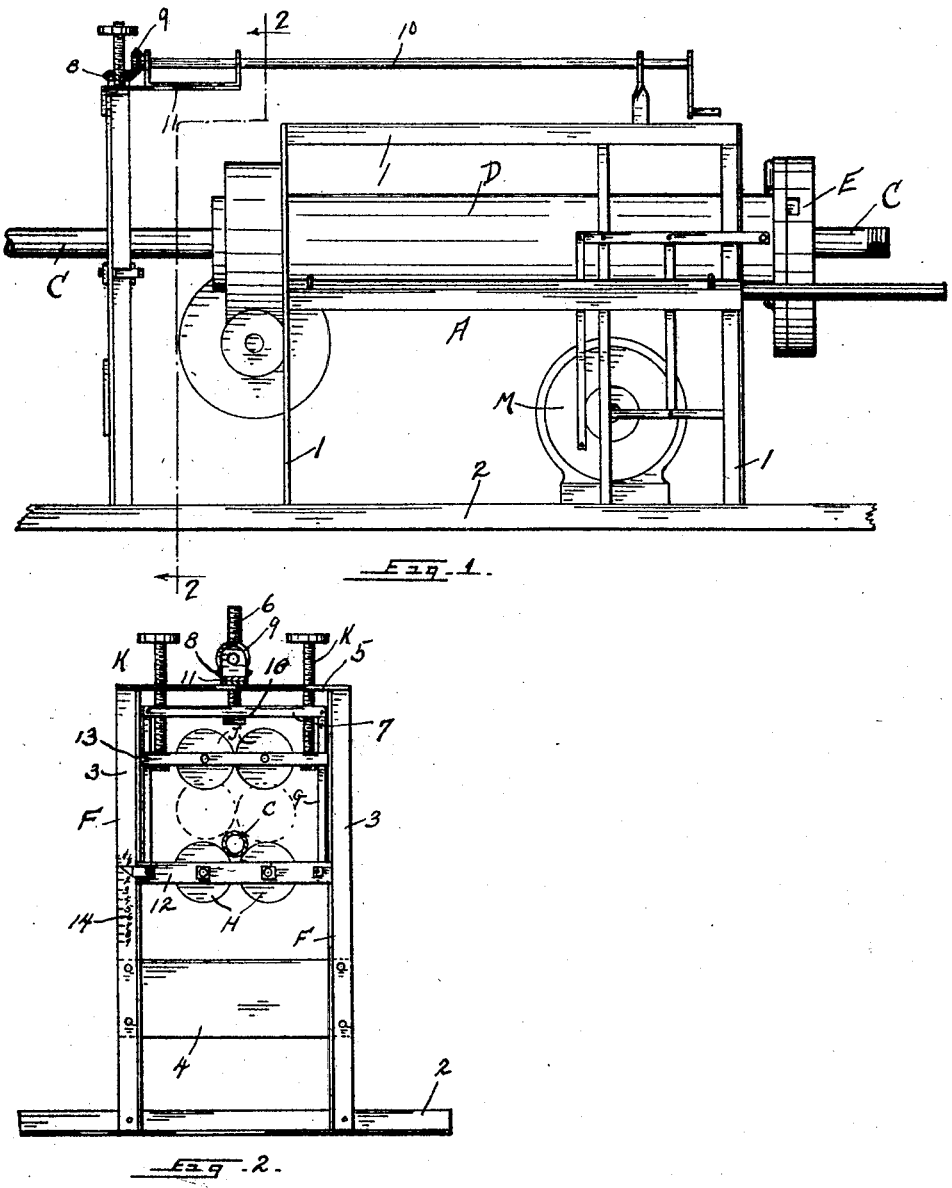
Inventor
Joseph B. Galbraith
By J. M. Thomas
Attorney Patented Mar. 16, 1926.

1,576,819

UNITED STATES PATENT OFFICE.

JOSEPH B. GALBRAITH, OF KAYSVILLE, UTAH.

CENTERING AND ALIGNING APPARATUS.

Application filed April 18, 1925. Serial No. 24,116.

*To all whom it may concern:*

Be it known that I, JOSEPH B. GALBRAITH, a citizen of the United States, residing at Kaysville, in the county of Davis and State of Utah, have invented certain new and useful Improvements in Centering and Aligning Apparatus, of which the following is a specification.

My invention relates to centering devices and has for its object to provide a new and efficient means of holding a pipe or bar in a central position while it is being rotated in a lathe or pipe-threading device.

These objects I accomplish with the device illustrated in the accompanying drawings in which similar letters and numerals of reference indicate like parts throughout the several views and as described in the specification forming a part of this application and pointed out in the appended claims.

In the drawings in which I have shown the best and most substantial embodiment of my invention, Figure 1 is a side elevation of my device in place and operable, with a pipe-threading device. Figure 2 is a section on line 2—2 of Figure 1.

In the drawings I have shown the threading device as A, which consists of a frame 1 that is supported by a base 2, and upon which is mounted the pipe rotating mechanism, with a pipe C therein. The pipe rotating mechanism consists of a motor M, which is connected by gears and belts with a cylindrical casing D, on one end of which is fastened the chuck E. My invention consists of a rectangular frame F vertically secured to said base 2. The said frame F has two spaced apart guide standards 3 which are held in spaced relation with each other by the cross piece 4 and the cross member 5. The said guide standards 3 are to guide the vertically movable rack G by the cross members 12 and 13, whose ends are bifurcated and slide on the faces of said standards. The said cross member 5 is medially bored to receive the lower portion of an externally threaded shaft 6, upon which a lock nut 16 is turned to engage the under side of a cross member 7 which forms a part of said rack G. An internally threaded pinion nut 8 is operated on said shaft 6 by the teeth of a bevel gear 9 meshing with the teeth of said pinion nut 8. A crank rod 10 is horizontally mounted at one end, on said frame 1, and at the other end on said frame F, by the bearing bracket 11, and said bevel gear 9 is secured thereon. Two spaced apart rollers H are journalled in the lower cross beam 12 of said rack G to support the pipe or shaft C which is to be centered. Two other binding rollers J are journalled in guide strips 13, which are vertically movable by the hand screws K which are engaged with said cross member 5 by threads and is the means used in moving said rollers J into or out of contact with the piece to be centered, and said screws K are rotatable in said guide strips 13. In centering a pipe for threading the end thereof is placed on the rollers H and by the operator raising the other end of the pipe it may be slid into said cylinder D and through the chuck E. Then, to bring the pipe to the desired horizontal position, the operator turns the said crank shaft 10 through its connections to thereby raise or lower the pipe to the desired position, and to aid the operator in determining this position a graduated scale 14 is marked on the face of one of said vertical standards 3, to indicate the position for pipe of different sizes, which scale is readable from the operator's position near the chuck, which chuck is operated in the usual manner to grip the pipe. If desired, the said rollers J are then moved downwardly to engage said pipe on its upper side, by rotating the said hand screws K. As will be obvious, my device may be used to center any round object.

Having thus described my invention I desire to secure by Letters Patent and claim:—

1. A centering device comprising a frame having a perforated cross member; a rack vertically movable in said frame; spaced apart rollers journalled in the lower member of said rack; a screw jack mounted on the upper cross member of said frame by which said rack is moved; means to operate said screw jack; and other spaced apart rollers vertically movable in said rack to engage a piece resting on said first-mentioned rollers.

2. A centering device comprising a frame having a perforated cross member; a rack suspended from said cross member and movable in said frame; spaced apart rollers mounted in the lower member of said rack; a screw with its head engaged in said rack; a pinion nut mounted on said frame with its teeth engaging the teeth of said screw; a crank rod mounted on said frame; a bevel gear secured on said crank shaft and whose teeth engage the teeth of said pinion nut; and other rollers carried in said rack to engage a pipe resting on said first-mentioned rollers.

In testimony whereof I have affixed my signature.

J. B. GALBRAITH.